United States Patent
Xiao et al.

(10) Patent No.: US 12,443,237 B2
(45) Date of Patent: Oct. 14, 2025

(54) BENDABLE FILM STRUCTURE AND MANUFACTURING METHOD THEREOF, DISPLAY PANEL, AND DISPLAY DEVICE

(71) Applicant: Shanghai Tianma Microelectronics Co., Ltd., Shanghai (CN)

(72) Inventors: Chuanfu Xiao, Shanghai (CN); Jian Jin, Shanghai (CN)

(73) Assignee: Shanghai Tianma Microelectronics Co., Ltd., Shanghai (CN)

(*) Notice: Subject to any disclaimer, the term of this patent is extended or adjusted under 35 U.S.C. 154(b) by 0 days.

(21) Appl. No.: 18/209,660

(22) Filed: Jun. 14, 2023

(65) Prior Publication Data
US 2023/0324959 A1    Oct. 12, 2023

(30) Foreign Application Priority Data

Dec. 30, 2022    (CN) .......................... 202211739408.1

(51) Int. Cl.
G06F 1/16    (2006.01)

(52) U.S. Cl.
CPC .......... G06F 1/1652 (2013.01); G06F 1/1601 (2013.01); G06F 1/1639 (2013.01); G06F 1/1641 (2013.01); G06F 2200/16 (2013.01)

(58) Field of Classification Search
CPC ... G06F 1/1652; G06F 1/1641; H10K 77/111; G09F 9/301
See application file for complete search history.

(56) References Cited

U.S. PATENT DOCUMENTS

| | | | | |
|---|---|---|---|---|
| 2018/0149904 A1* | 5/2018 | Song | ................. | G02F 1/133305 |
| 2020/0103741 A1* | 4/2020 | Song | .................... | H04N 9/3173 |
| 2020/0272204 A1* | 8/2020 | Su | .......................... | G06F 1/1652 |
| 2020/0328234 A1* | 10/2020 | Zhang | ................... | G02F 1/1362 |
| 2021/0143234 A1* | 5/2021 | Yu | .......................... | H10K 59/12 |
| 2021/0247804 A1* | 8/2021 | Ha | ....................... | G06F 1/1652 |
| 2021/0251090 A1* | 8/2021 | Ha | .......................... | G06F 1/1652 |
| 2022/0088911 A1* | 3/2022 | Kim | ....................... | B32B 17/10 |
| 2022/0189349 A1* | 6/2022 | Roh | ........................ | B32B 15/08 |
| 2025/0083199 A1* | 3/2025 | Kim | ..................... | B08B 9/0328 |

FOREIGN PATENT DOCUMENTS

| | | | | |
|---|---|---|---|---|
| CN | 113658515 A | 11/2021 | | |
| CN | 214587752 U | 11/2021 | | |
| CN | 115083277 A | 9/2022 | | |
| CN | 115240557 A | 10/2022 | | |
| KR | 20200052167 A | * 5/2020 | ........... | G06F 1/1616 |

* cited by examiner

*Primary Examiner* — William Boddie
*Assistant Examiner* — Bipin Gyawali
(74) *Attorney, Agent, or Firm* — KDW FIRM PLLC

(57) ABSTRACT

Provided are a bendable film structure and a manufacturing method thereof, a display panel, and a display device. The bendable film structure includes at least one bendable region, a flexible substrate, and a filler layer. In the at least one bendable region, a first side of the flexible substrate includes multiple first recesses, and the filler layer includes a first filler layer that fills the multiple first recesses; and/or a second side of the flexible substrate includes multiple second recesses, and the filler layer also includes a second filler layer that fills the multiple second recesses. The first side is the inner side of the flexible substrate when the bendable film structure is bent. The second side is opposite to the first side. At least one of the first filler layer or the second filler layer has an elasticity greater than the flexible substrate.

28 Claims, 10 Drawing Sheets

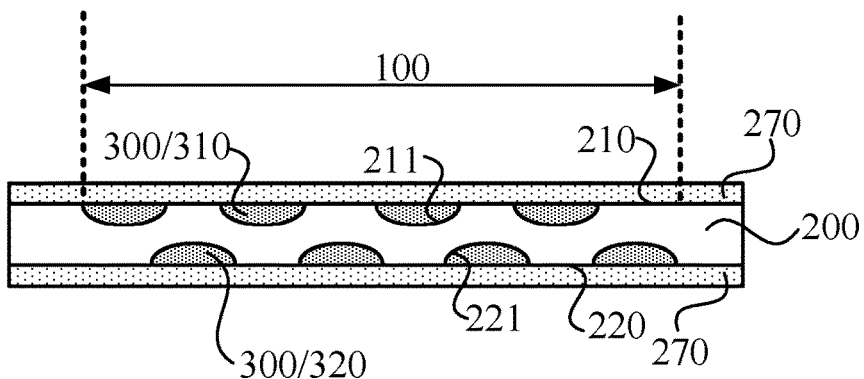

FIG. 19

| Form a flexible substrate, where the flexible substrate includes at least one bendable region, where in each of the at least one bendable region, multiple first recesses are configured on a first side of the flexible substrate, and/or multiple second recesses are configured on a second side of the flexible substrate | S110 |
|---|---|
| Form a first filler layer in a respective first recess of the multiple first recesses and form a second filler layer in a respective second recess of the multiple second recesses, where at least one of the first filler layer or the second filler layer has an elasticity greater than the flexible substrate | S120 |
| Process surfaces of the bendable region such that when the bendable film structure is unbent, the surface of the first filler layer facing away from the second filler layer is flush with the surface of the flexible substrate on two sides of each first recess, and the surface of the second filler layer facing away from the second filler layer is flush with the surface of the flexible substrate on two sides of each second recess | S130 |

FIG. 20

BENDABLE FILM STRUCTURE AND MANUFACTURING METHOD THEREOF, DISPLAY PANEL, AND DISPLAY DEVICE

CROSS-REFERENCE TO RELATED APPLICATION(S)

This application claims priority to Chinese Patent Application No. 202211739408.1 filed Dec. 30, 2022, the disclosure of which is incorporated herein by reference in its entirety.

TECHNICAL FIELD

Embodiments of the present disclosure relate to the field of display technology, particularly a bendable film structure and a manufacturing method thereof, a display panel, and a display device.

BACKGROUND

Flexible screens are both large and portable and thus are mostly regarded as a trend for a new generation of cellphones. An existing flexible screen includes multiple layers of polymer films. These polymer films are insufficient in elasticity and supporting capacity and weak in impact resistance. As a result, after bent repeatedly for a long time, these polymer films have problems including unevenness, enlarged bending lines, and unrecoverable deformation caused by creep, affecting the appearance and display performance of the display panel.

SUMMARY

Embodiments of the present disclosure provide a bendable film structure and a manufacturing method thereof, a display panel, and a display device so that when the flexible substrate of the bendable film structure is bent or impacted, part of deformation force can be absorbed, creep of films can be reduced, and bending lines can be alleviated.

In a first aspect, an embodiment of the present disclosure provides a bendable film structure. The bendable film structure includes at least one bendable region, a flexible substrate, and a filler layer.

In the at least one bendable region, a plurality of first recesses are configured on a first side of the flexible substrate, and the filler layer includes a first filler layer that fills a respective first recess; and/or a plurality of second recesses are configured on a second side of the flexible substrate, and the filler layer also includes a second filler layer that fills a respective second recess.

The first side is the inner side of the flexible substrate when the bendable film structure is bent. The second side is opposite to the first side.

At least one of the first filler layer or the second filler layer has an elasticity greater than the flexible substrate.

In a second aspect, an embodiment of the present disclosure provides a manufacturing method of a bendable film structure.

The method includes forming a flexible substrate, where the flexible substrate includes at least one bendable region, where in the at least one bendable region, a plurality of first recesses are configured on a first side of the flexible substrate, and/or a plurality of second recesses are configured on a second side of the flexible substrate; forming a first filler layer in a respective first recess and forming a second filler layer in a respective second recess, where at least one of the first filler layer or the second filler layer has an elasticity greater than the flexible substrate; and processing a surface of the bendable region such that when the bendable film structure is unbent, a surface of the first filler layer facing away from the second filler layer is flush with a surface of the flexible substrate on two sides of each first recess, and a surface of the second filler layer facing away from the second filler layer is flush with a surface of the flexible substrate on two sides of each second recess.

In a third aspect, an embodiment of the present disclosure provides a display panel that includes the bendable film structure of the first aspect.

In a fourth aspect, an embodiment of the present disclosure provides a display device that includes the display panel of the third aspect.

The bendable film structure in the embodiment of the present disclosure includes at least one bendable region. In the at least one bendable region, a plurality of first recesses are configured on a first side of the flexible substrate, and/or a plurality of second recesses are configured on a second side of the flexible substrate. In one embodiment, the bendable film structure also includes a filler layer. The filler layer includes a first filler layer that fills a respective first recess, and/or the filler layer also includes a second filler layer that fills a respective second recess. At least one of the first filler layer or the second filler layer has an elasticity greater than the flexible substrate. That is, each recess on the first side and/or the second side of the flexible substrate is filled by a high-elastic filler layer so that when the flexible substrate is bent or impacted, the filler layer can absorb part of deformation force, reduce creep of the flexible substrate, and alleviate bending lines in the bendable region of the bendable film structure, thereby ensuring the structural stability of the bendable film structure.

BRIEF DESCRIPTION OF DRAWINGS

To illustrate technical solutions in example embodiments of the present disclosure more clearly, a brief introduction to drawings required in the description of the embodiments will be given below. Apparently, the introduced drawings are merely part, not all, of drawings of the embodiments of the present disclosure to be described, and those of ordinary skill in the art may obtain other drawings based on the drawings described below on the premise that no creative work is done.

FIG. 19 is another section view taken along the section line A-A' of FIG. 1.

FIG. 20 is a flowchart of a manufacturing method of a bendable film structure according to an embodiment of the present disclosure.

DETAILED DESCRIPTION

To make the objects, solutions and advantages of the present disclosure clearer, the solutions of the present disclosure will be completely described below in conjunction with the embodiments and the drawings in the embodiments of the present disclosure. Apparently, the embodiments described herein are part, not all, of the embodiments of the present disclosure, and based on the embodiments of the present disclosure, all other embodiments obtained by those skilled in the art on the premise that no creative work is done are within the scope of the present disclosure.

It is to be noted that the terms "first", "second" and the like in the description, claims and drawings of the present disclosure are used for distinguishing between similar objects and are not necessarily used for describing a particular order or sequence. It should be understood that the data used in this manner is interchangeable in appropriate cases so that the embodiments of the present disclosure described here can be implemented in an order not illustrated or described here. In addition, terms "comprising", "including" and any other variations thereof are intended to encompass a non-exclusive inclusion. For example, a system, product or device that includes a series of units not only includes the expressly listed steps or units but may also include other units that are not expressly listed or are inherent to such a product or device.

Figure 1:
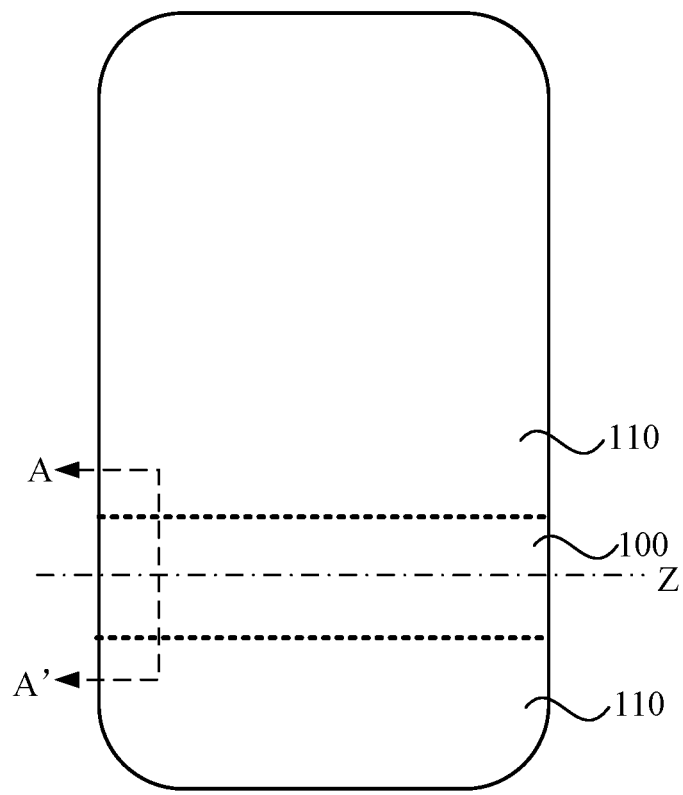
FIG. 1 is a diagram illustrating the structure of a bendable film structure according to an embodiment of the present disclosure.
Figure 2:
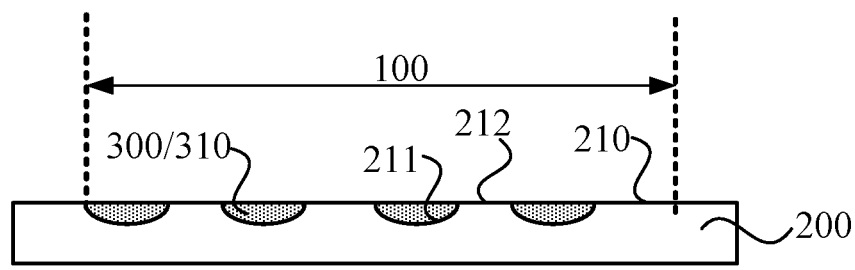
FIG. 2 is a section view taken along a section line A-A' of FIG. 1.
Figure 3:
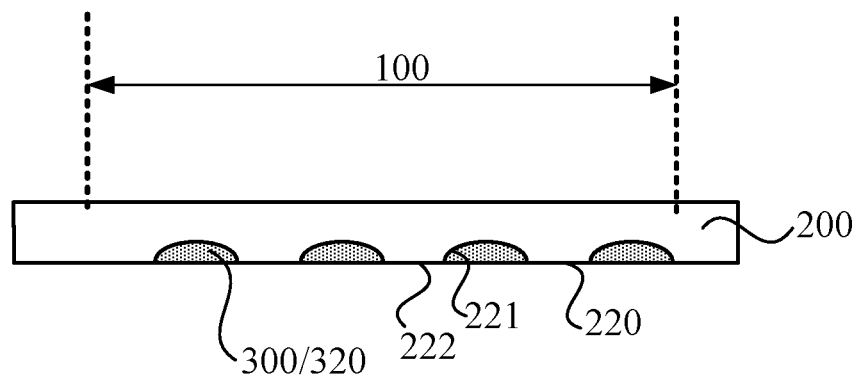
FIG. 3 is another section view taken along the section line A-A' of FIG. 1.
Figure 4:
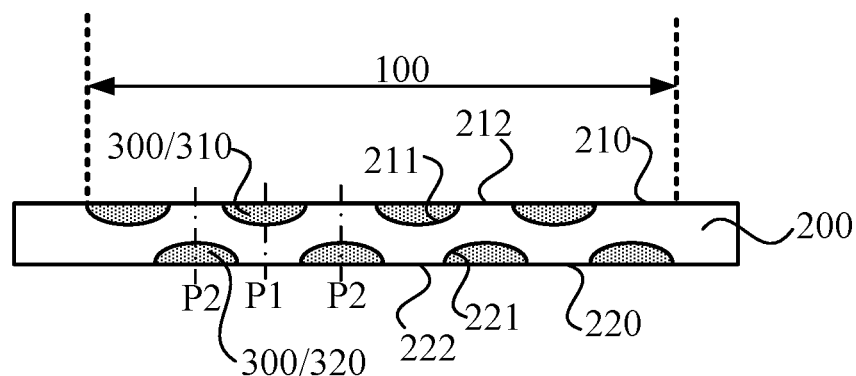
FIG. 4 is another section view taken along the section line A-A' of FIG. 1.
Figure 5:
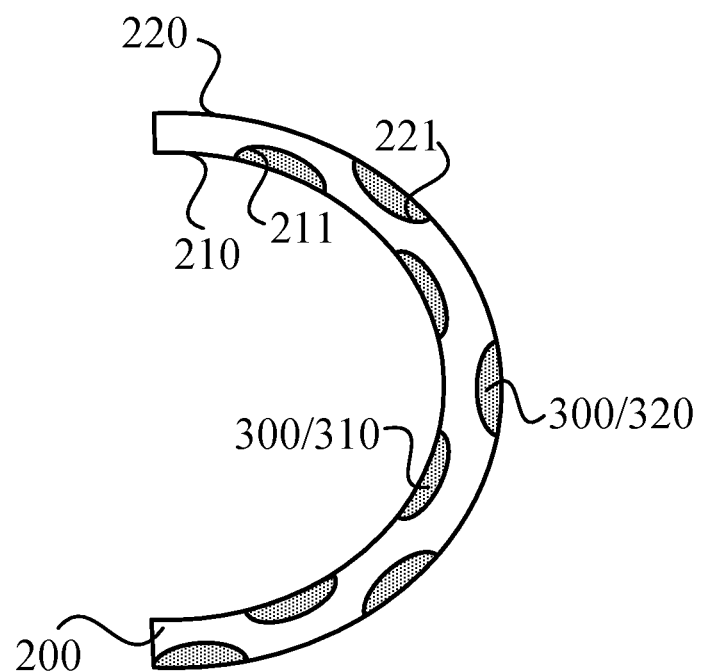
FIG. 5 is a diagram illustrating the structure of a bent flexible substrate according to an embodiment of the present disclosure.

FIG. 1 is a diagram illustrating the structure of a bendable film structure according to an embodiment of the present disclosure. FIG. 2 is a section view taken along the section line A-A' of FIG. 1. FIG. 3 is another section view taken along the section line A-A' of FIG. 1. FIG. 4 is another section view taken along the section line A-A' of FIG. 1. FIG. 5 is a diagram illustrating the structure of a bent flexible substrate according to an embodiment of the present disclosure. Referring to FIGS. 1 to 5, an embodiment of the present disclosure provides a bendable film structure 10. The bendable film structure 10 includes at least one bendable region 100, a flexible substrate 200, and a filler layer 300. In each of the at least one bendable region 100, multiple first recesses 211 are configured on a first side 210 of the flexible substrate 200, and the filler layer 300 includes a first filler layer 310 that fills a respective first recess 211; and/or multiple second recesses 221 are configured on a second side 220 of the flexible substrate 200, and the filler layer 300 also includes a second filler layer 320 that fills a respective second recess 221. The first side 210 is the inner side of the flexible substrate 200 when the bendable film structure 10 is bent. The second side 220 is opposite to the first side 210. At least one of the first filler layer 310 or the second filler layer 320 has an elasticity greater than the flexible substrate 200.

The bendable film structure 10 includes at least one bendable region 100 and can be bent or folded in the at least one bendable region 100, facilitating miniaturization of the display panel. Further, the bendable film structure 10 may include multiple bendable regions 100, that is, may be bent in multiple regions. This is not limited by this embodiment of the present disclosure. FIG. 1 illustrates that the bendable film structure 10 includes one bendable region 100.

In one embodiment, the bendable film structure 10 also includes a flexible substrate 200 and a filler layer 300. As shown in FIG. 2, the first side 210 of the flexible substrate 200 includes multiple first recesses 211, and the filler layer 300 includes a first filler layer 310 that fills a respective first recess 211. When the flexible substrate 200 is bent in the bendable region 100, each first recess 211 and the first filler layer 310 in each recess 211 have a large elasticity that can disperse the deformation stress generated by the flexible substrate 200, thereby reducing creep of the flexible substrate 200, alleviating bending lines in the bendable region 100 of the bendable film structure 10, and ensuring the structural stability of the bendable film structure 10.

As shown in FIG. 3, multiple second recesses 221 are configured on the second side 220 of the flexible substrate 200, and the filler layer 300 also includes a second filler layer 320 that fills a respective second recess 221. The second side 220 and the first side 210 are opposite sides of the flexible substrate 200. The first side 210 is the inner side of the flexible substrate 200 when the bendable film structure 10 is bent. As shown in FIG. 2 or FIG. 3, recesses disposed on either side of the flexible substrate 200 and filled by the filler layers 300 can reduce creep of the flexible substrate 200 and thus alleviate bending lines in the bendable region 100 of the bendable film structure 10.

As shown in FIG. 4, multiple first recesses 211 configured on the first side 210 of the flexible substrate 200 and filled by the first filler layers 310, and multiple second recesses 221 are disposed on the second side 220 of the flexible substrate 200 and filled by the second filler layers 320. As shown in FIG. 5, the first side 210 is the inner side of the flexible substrate 200 when the bendable film structure 10 is bent. The second side 220 is opposite to the first side 210. Recesses disposed on both sides of the flexible substrate 200 and filled by the filler layers 300 that may be more elastic than the flexible substrate 200 can better reduce creep of the flexible substrate 200 and thus can better alleviate bending lines in the bendable region 100 of the bendable film structure 10.

With continued reference to FIGS. 2 to 5, at least one of the first filler layer 310 or the second filler layer 320 has an elasticity greater than the flexible substrate 200. That is, the first recesses 211 or the second recesses 221 are filled by a high-elastic material so that when the flexible substrate 200 is bent or impacted, the first filler layer 310 and the second filler layer 320 can effectively absorb part of deformation force and reduce creep generated between films, thereby ensuring the structural stability of the flexible substrate 200 and the structural stability of the bendable film structure 10.

In the bendable film structure of this embodiment of the present disclosure, recesses configured on the first side and/or the second side of the flexible substrate are filled by high-elastic filler layers so that when the flexible substrate is bent or impacted, the filler layers can absorb part of deformation force, reduce creep of the flexible substrate, and alleviate bending lines in the bendable region of the bendable film structure, thereby ensuring the structural stability of the bendable film structure.

With continued reference to FIGS. 2 to 4, when the bendable film structure 10 is unbent, at least part of the surface of the filler layer 300 facing away from the flexible substrate 200 is flush with at least part of the surface of a non-recessed region 212 or 222.

Multiple recesses are configured on the first side 210 and/or the second side 220 of the flexible substrate 200. A non-recessed region 212 or 222 of the flexible substrate 200 is disposed between two adjacent recesses.

In one embodiment, as shown in FIG. 2, multiple first recesses 211 are configured on the first side 210 of the flexible substrate 200. A non-recessed region 212 is disposed between two adjacent first recesses 211. Moreover, at least part of the surface of the first filler layer 310 filled in each first recess 211 is flush with at least part of the surface of the non-recessed region 212, ensuring that the flexible substrate 200 is even and thus ensuring that the bendable film structure has even surfaces.

In one embodiment, as shown in FIG. 3, multiple second recesses 221 are configured on the second side 220 of the flexible substrate 200. A non-recessed region 222 is disposed between two adjacent second recesses 221. Moreover, at least part of the surface of the second filler layer 320 filled in each second recess 221 is flush with at least part of the surface of the non-recessed region 222, ensuring that the flexible substrate 200 is even and thus ensuring that the bendable film structure 10 has even surfaces.

In one embodiment, as shown in FIG. 4, multiple first recesses 211 are configured on the first side 210 of the flexible substrate 200, and a non-recessed region 212 is disposed between two adjacent first recesses 211; and multiple second recesses 221 are configured on the second side 220 of the flexible substrate 200, and a non-recessed region 222 is disposed between two adjacent second recesses 221. Moreover, at least part of the surface of the first filler layer 310 filled in each first recess 211 is flush with at least part of the surface of the non-recessed region 212, and at least part of the surface of the second filler layer 320 filled in each second recess 221 is flush with at least part of the surface of the non-recessed region 222, ensuring that both surfaces of the flexible substrate 200 are even, ensuring that the bendable film structure 10 has even surfaces, and facilitating subsequent manufacturing of other films.

Figure 6:
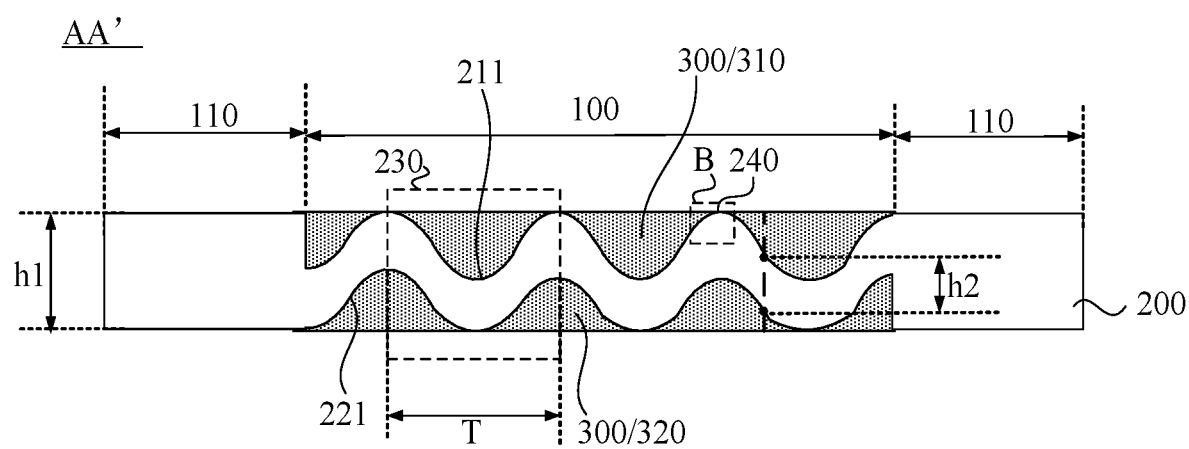
FIG. 6 is another section view taken along the section line A-A' of FIG. 1.

FIG. 6 is another section view taken along the section line A-A' of FIG. 1. With continued reference to FIGS. 1 and 6, the flexible substrate 200 includes multiple cyclic repetitive units 230 in the bendable region 100. The projection of a repetitive unit 230 on a first plane includes at least one curve. A first recess 211 and/or a second recess 221 is formed in a hollow of the curve. The first plane is perpendicular to the plane where the flexible substrate 200 is located. The first plane is perpendicular to a bending axis Z of the bendable film structure 10.

The flexible substrate 200 includes multiple repetitive units 230 in the bendable region 100. The multiple repetitive units 230 are repeatedly arranged in a cyclic manner. Further, referring to FIG. 6, the flexible substrate 200 includes multiple repetitive units 230 in the bendable region 100. The projection of a repetitive unit 230 on the first plane includes at least one curve. The first plane may show the flexible substrate 200 shown in FIG. 6. The shape of the repetitive units 230 of the flexible substrate 200 can be shown by the first plane.

As shown in FIG. 6, the flexible substrate 200 in the bendable region 100 is a curve, and a first recess 211 and/or a second recess 221 may be configured in a hollow of the curve. That is, as shown in FIG. 6, it is feasible to configure first recesses 211 and second recesses 221 at both sides of the curve or configure only first recesses 211 or only second recesses 221 at one side of the flexible substrate 200. This is not limited by this embodiment of the present disclosure. In other words, the flexible substrate 200 may include multiple repetitive microfold structures in the bendable region 100. The microfold structures can disperse an impact force to two sides of the flexible substrate 200 to improve the impact resistance of the flexible substrate 200 when the flexible substrate 200 is impacted. When the bendable film structure 10 is bent, the repetitive units 230 of the flexible substrate 200, that is, the microfold structures, can be deformed by stretch. The large elasticity of the filler layer 300 in each recess can reduce deformation of the flexible substrate 200 and thus ensure the structural stability of the bendable film structure 10.

With continued reference to FIG. 6, the bendable film structure 10 also includes an unbendable region 110 located on two sides of the bendable region 100. Along the direction perpendicular to the extension direction of the flexible substrate 200, the thickness h2 of at least part of the flexible substrate 200 in the bendable region 100 is less than the thickness h1 of the flexible substrate 200 in the unbendable region 110.

As shown in FIG. 6, the bendable film structure also includes an unbendable region located on two sides of the bendable region 100. Further, along the direction perpendicular to the extension direction of the flexible substrate 200, that is, along the thickness direction of the flexible substrate 200, the thickness of the flexible substrate 200 in the unbendable region 110 is h1, and the thickness of part of the flexible substrate 200 in the bendable region 100 is approximately h2. That is, the thickness h2 of at least part of the flexible substrate 200 in the bendable region 100 is less than the thickness h1 of the flexible substrate 200 in the unbendable region 110. The thickness of the flexible substrate 200 can be adjusted so that the filler layer 300 can be added to the bendable region 100 when the flexible substrate 200 has a balanced thickness. In this manner, deformation stress possibly generated by the flexible substrate 200 can be alleviated and released.

That is, the flexible substrate 200 in the bendable region 100 has a small thickness so that a larger space can be reserved for placing the filler layer 300. In this manner, when the flexible substrate 200 is bent or deformed, stress can be better dispersed, and the structural stability of the flexible substrate 200 can be ensured. Moreover, it is possible to ensure that the thickness of the flexible substrate 200 of the bendable region 100 filled by the filler layer 300 is approximately the same as the thickness of the unbendable region 110 so that no additional thickness occurs and so that the bendable film structure 10 can be even and thin.

With continued reference to FIG. 6, the cycle T of each repetitive unit 230 satisfies 100 μm≤T≤500 μm.

In one embodiment, as shown in FIG. 6, the repetitive cycle T of a repetitive unit 230 is defined, that is, the size of a hollow or microfold of the repetitive unit 230 is defined, so that the size of a first recess 211 and/or a second recess 221 is defined. The inventors have found through research that when the flexible substrate 200 in the bendable region 100 is bent under force, the flexible substrate 200 having the cyclic repetitive units 230 produces tensile deformation. On the one hand, when the cycle T of a repetitive unit 230 is too large, the number of repetitive units 230 that can be included in the bendable region 100 is too small, so the tensile deformation force on the flexible substrate 200 in the bendable region 100 is dispersed by a small number of repetitive units 230, so each repetitive unit 230 bears a relatively large deformation force, resulting in an unstable flexible substrate 200. On the other hand, the hollow of each repetitive unit 230 is filled by an elastic filler material, that is, the filler layer 300. The filler layer 300 can disperse the deformation force of the flexible substrate 200 in the bendable region 100. If the cycle T of a repetitive unit 230 is too small, the size of the microfold formed by the repetitive unit 230 is too small, and thus the size of the filler layer 300 is too small. As a result, the filler layer 300 can bear a rather small stress and cannot well disperse the stress when the flexible substrate 200 is bent under force, and thus the bendable region 100 of the bendable film structure 10 is unstable. Therefore, the size of each microfold is defined in this embodiment to ensure the effect of stress dispersion. That is, when the flexible substrate 200 is impacted or folded, each repetitive unit 230 disperses stress in the direction parallel to the extension direction of the flexible substrate 200. Moreover, the high-elastic material, that is, the filler layer 300, in each recess enhances the impact resistance of the flexible substrate 200 and thereby ensures the structural stability of the bendable film structure 10.

Figure 7:
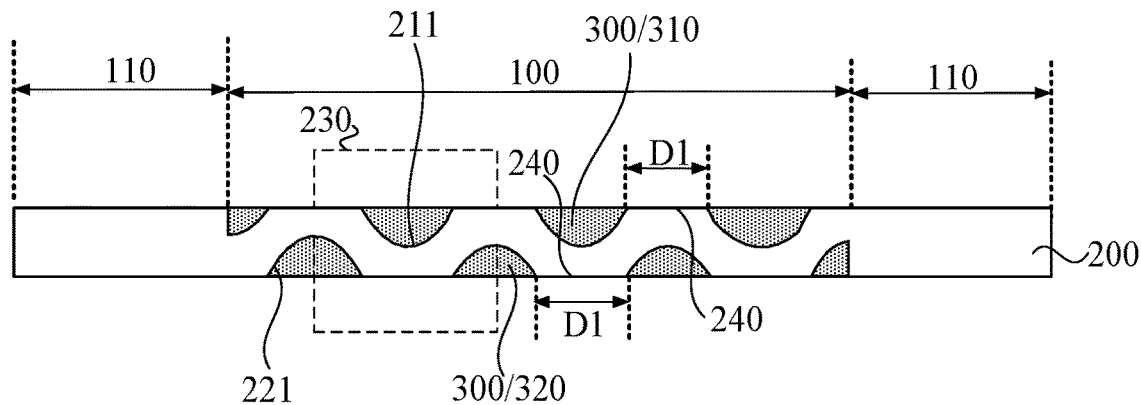
FIG. 7 is another section view taken along the section line A-A' of FIG. 1.

FIG. 7 is another section view taken along the section line A-A' of FIG. 1. Referring to FIGS. 6 and 7, the bendable film structure 10 also includes an unbendable region 110 located on two sides of the bendable region 100. In the bendable region 100, the flexible substrate 200 includes a flat region 240. The flat region 240 is located between adjacent first recesses 211 and/or between adjacent second recesses 221. A surface of the flat region 240 is flush with a surface of the flexible substrate 200 in the unbendable region 110, where the surface of the flat region 240 is on the same side as the surface of the flexible substrate 200 in the unbendable region 110.

The bendable film structure 10 also includes an unbendable region 110 located on two sides of the bendable region 100. Referring to FIGS. 6 and 7, the flexible substrate 200 includes a flat region 240. The flat region 240 is located in the bendable region 100 and between two adjacent first recesses 211 and/or second recesses 221. On the one hand, the flat region 240 ensures that when the flexible substrate 200 is impacted or bent, stress generated in the flexible substrate in the bendable region 100 can be well dispersed to the unbendable region 110, avoiding stress concentration of the flexible substrate in the bendable region 100, reducing creep of the flexible substrate, and ensuring the structural stability of the bendable film structure 10. On the other hand, the flat region 240 ensures that both surfaces of the flexible substrate 200 are even, ensuring that the bendable film structure 10 has even surfaces, and facilitating subsequent manufacturing of other films.

With continued reference to FIGS. 1 and 7, along the direction perpendicular to the bending axis Z of the bendable film structure 10, the width D1 of the flat region 240 satisfies 50 μm≤D1≤250 μm.

As shown in FIG. 7, the width D1 of the flat region 240 satisfies 50 μm≤D1≤250 μm, for example, 50 μm, 100 μm, 150 μm, 200 μm, or 250 μm. The value of the width D1 is not limited by this embodiment of the present disclosure. The inventors have found through research that on the one hand, when the width D1 of the flat region 240 is too large, for example, when D1>250 μm, the region where a microfold is disposed is smaller, so the number or size of the filler layers 300 is reduced. As a result, the effect of stress dispersion is not good when the flexible substrate 200 in the bendable region 100 is bent, and thus the stability of the bendable film structure 10 is affected. On the other hand, when the width D1 of the flat region 240 is too small, for example, when D1<50 μm, the flexible substrate 200 that forms the flat region 240 is too small in size and thus easily breaks after being bent repeatedly, affecting the structural stability of the bendable film structure 10. Therefore, the width D1 of the flat region 240 is adjusted in this embodiment to ensure that when the flexible substrate 200 in the bendable region 100 is bent or impacted, bending lines are alleviated, the flexible substrate 200 cannot break, and thus the structural stability of the bendable film structure 10 is ensured.

With continued reference to FIG. 6, the interface between the flat region 240 and the filler layer 300 is a smooth curved surface.

As shown in region B of FIG. 6, the intersection of the flat region 240 and the filler layer 300 is transitioned by a smooth curved surface. Here when the flexible substrate 200 in the bendable region 100 is bent under force, the smooth curved surface can avoid stress concentration at a bending point. In this manner, when the flexible substrate 200 in the bendable region 100 is bent or impacted, the structural stability of the flexible substrate 200 cannot be destroyed by stress concentration, and thus the structural stability of the flexible substrate 200 and the structural stability of the bendable film structure 10 are ensured.

Figure 8:
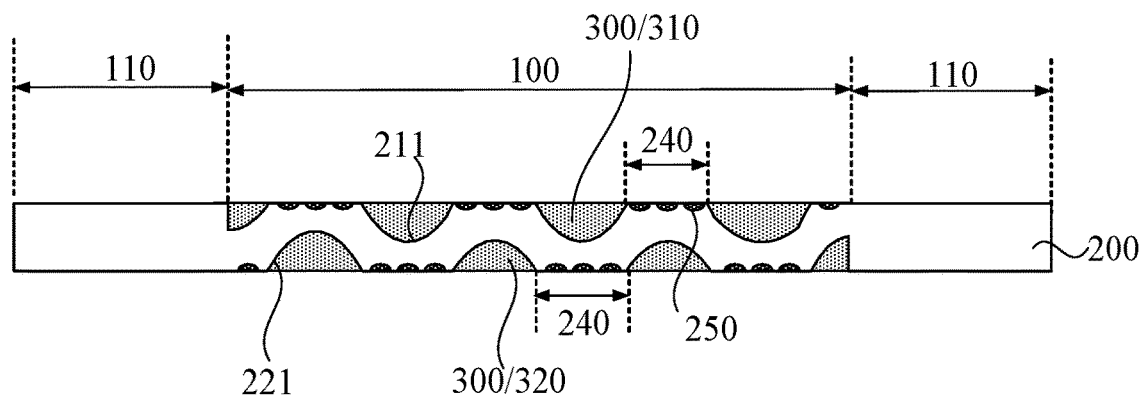
FIG. 8 is another section view taken along the section line A-A' of FIG. 1.

FIG. 8 is another section view taken along the section line A-A' of FIG. 1. As shown in FIG. 8, the surface of the flat region 240 includes multiple first sub-recesses 250.

As shown in FIG. 8, the flexible substrate 200 also includes multiple first sub-recesses 250, and the multiple first sub-recesses 250 are located on the surface of the flat region 240. Adding multiple first sub-recesses 250 in the flat region 240 of the flexible substrate 200 is equivalent to adding microfolds in the flat region 240. The multiple first sub-recesses 250 can ensure a subsequent close contact between the flexible substrate 200 and adjacent films. For example, an optical adhesive layer is pasted to each of the two sides of the flexible substrate 200. The first sub-recesses 250 can increase the area of contact between the optical adhesive layer and the flexible substrate 200 and improve the reliability of connection between the optical adhesive layer and the flexible substrate 200. The first sub-recesses 250 can also play the role of positioning. An adjacent film such as the optical adhesive layer can engage with the flexible substrate 200 through the first sub-recesses 250. That is, the first sub-recesses 250 can prevent the optical adhesive layer and the flexible substrate 200 from being staggered horizontally along the plane where the flexible substrate 200 is located, reducing the possibility of staggering of films. In this embodiment, the multiple first sub-recesses 250 can ensure a close contact between the flexible substrate 200 and the optical adhesive layer, ensuring the structural stability of the bendable film structure 10. Further, the filler layer 300 may also be filled in a respective first sub-recess 250 so that when the flexible substrate 200 is bent or impacted, stress is alleviated and dispersed, and thus the structural stability of the flexible substrate 240 is ensured.

Figure 9:
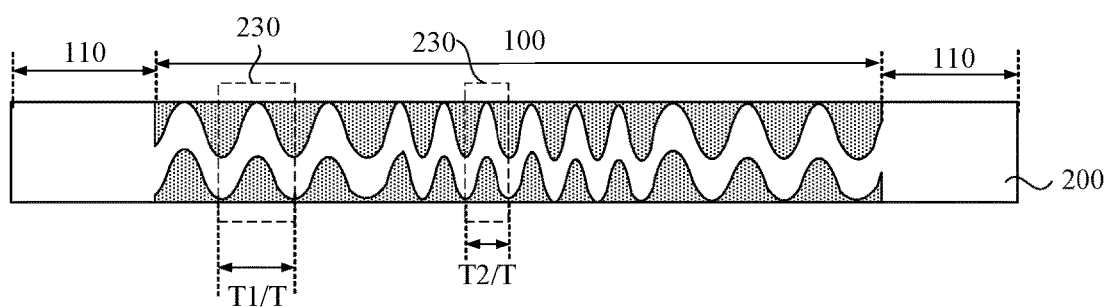
FIG. 9 is another section view taken along the section line A-A' of FIG. 1.

FIG. 9 is another section view taken along the section line A-A' of FIG. 1. As shown in FIG. 9, along the direction X from the center of the bendable region 100 to the unbendable region, the cycle of the repetitive unit 230 increases.

As shown in FIG. 9, the cycle T2 of the repetitive unit 230 adjacent to the center region of the bendable region 100 is smaller than the cycle T1 of the repetitive unit 230 adjacent to the edge region of the bendable region 100. That is, the repetitive units 230 of the flexible substrate 200 do not have the same size throughout the bendable region 100. Moreover, the smaller the cycle T, the bigger the volume of the filler layer 300 filled in a unit region, the greater the elasticity, and the stronger the capability of alleviating stress. Specifically, when the flexible substrate 200 is bent or impacted, the flexible substrate 200 adjacent to the center region of the bendable region 100 generates more stress, and the flexible substrate 200 far from the center region of the bendable region 100 generates less stress. The cycle T of each repetitive unit 230 can be adjusted, and stress at various positions of the flexible substrate 200 in the bendable region 100 can be balanced, so that the structural stability of the bendable film structure 10 is ensured. Moreover, it is possible to avoid a waste of high-elastic material in the filler layer 300 and thus save costs by setting the filler layer 300 according to stress difference.

Figure 10:
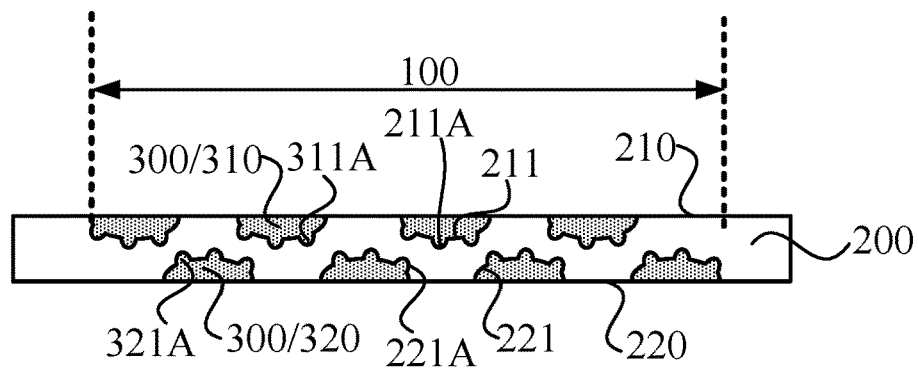
FIG. 10 is another section view taken along the section line A-A' of FIG. 1.

FIG. 10 is another section view taken along the section line A-A' of FIG. 1. As shown in FIG. 10, the inner wall of a first recess 211 includes multiple second sub-recesses 211A, the first filler layer 310 includes multiple first protrusions 311A, and a first protrusion 311A fills a second sub-recess 211A; and/or the inner wall of a second recess 221 includes multiple third sub-recesses 221A, the second filler layer 320 includes multiple second protrusions 321A, and a second protrusion 321A fills a third sub-recess 221A.

As shown in FIG. 10, the flexible substrate 200 includes first recesses 211 and second recesses 221, the inner wall of a first recess 211 also includes multiple second sub-recesses 211A, and the inner wall of a second recess 221 may also include multiple third sub-recesses 221A. Further, the flexible substrate 200 may include only first recesses 211 or may include only second recesses 221, where the inner wall of a first recess 211 also includes multiple second sub-recesses 211A, or the inner wall of a second recess 221 may also include multiple third sub-recesses 221A. This is not limited by this embodiment of the present disclosure.

In one embodiment, when the flexible substrate 200 includes multiple second sub-recesses 211A, the first filler layer 310 includes multiple first protrusions 311A that fill the second sub-recesses 211A; and when the flexible substrate 200 includes multiple third sub-recesses 221A, the second filler layer 320 includes multiple second protrusions 321A that fill the third sub-recesses 221A. That is, the new first protrusions 311A engage with the second sub-recesses 211A, improving the structural stability of the flexible substrate 200; and/or the new second protrusions 321A engage with the third sub-recesses 221A, also improving the structural stability of the flexible substrate 200. That is, in the flexible substrate 200 in the bendable region 100, multiple sub-recesses, that is, the second sub-recesses 211A and/or the third sub-recesses 221A are added and engage with protrusions, that is, the first protrusions 311A and/or the second protrusions 321A, provided by the filler layer 300, preventing the filler layer 300 and the corresponding recess from being staggered, improving the structural stability of the flexible substrate 200, and ensuring the structural stability of the flexible substrate 200 and the structural stability of the bendable film structure 10 when the flexible substrate 200 is bent or impacted repeatedly. Moreover, the protrusions can increase the area of contact between the filler layer 300 and the flexible substrate 200 at the corresponding recess and thereby improve the reliability of connection between the filler layer 300 and the corresponding recess.

Figure 11:
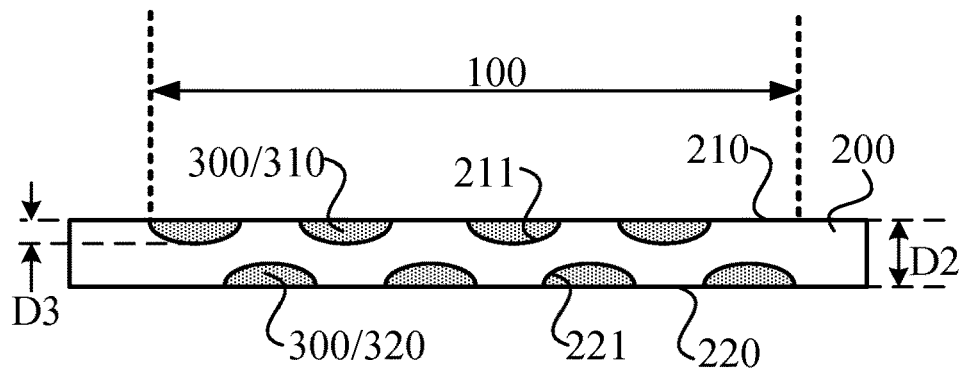
FIG. 11 is another section view taken along the section line A-A' of FIG. 1.

FIG. 11 is another section view taken along the section line A-A' of FIG. 1. As shown in FIG. 11, along the direction perpendicular to the extension direction of the flexible substrate 200, the thickness D3 of the filler layer 300 is less than half of the thickness D2 of the flexible substrate 200.

Along the direction perpendicular to the extension direction of the flexible substrate 200, that is, along the thickness direction of the flexible substrate 200, the thickness of the filler layer 300 is D3, and the thickness of the flexible substrate 200 is D2. As shown in FIG. 11, when the thickness D3 of the filler layer 300 is less than half of the thickness D2 of the flexible substrate 200, the thickness of the flexible substrate 200 in the bendable region 100 is less than half of the thickness of the flexible substrate 200 in the unbendable region 110. When bent or impacted, the flexible substrate 200 may break due to a reduction in thickness. Therefore, the thickness of the filler layer 300 should not be too large so that when bent or impacted, the flexible substrate 200 does not break due to a reduction in thickness. In the bendable film structure 10 of this embodiment of the present disclosure, the recesses of the flexible substrate 200 are filled by the filler layer 300 and disperse stress, and the thickness of the filler layer 300 can be adjusted, better ensuring that the flexible substrate 200 does not break due to a too large thickness and ensuring the structural stability of the bendable film structure 10.

Optionally, the thickness D3 of the filler layer 300 satisfies $10\ \mu m \le D3 \le 50\ \mu m$.

Generally, the thickness of the flexible substrate 200 is not greater than 100 μm, and the thickness D3 of the filler layer 300 may be 10 μm, 20 μm, 30 μm, 40 μm, or 50 μm as long as $10\ \mu m \le D3 \le 50\ \mu m$. The thickness of the filler layer 300 may be set flexibly depending on the flexible substrate 200 and is not limited by this embodiment of the present disclosure.

With continued reference to FIG. 4, the flexible substrate 200 includes first recesses 211 and second recesses 221, where the orthographic projection of the center P1 of a first recess 211 on the flexible substrate 200 and the orthographic projection of the center P2 of a second recess 221 on the flexible substrate 200 are staggered.

Specifically, as shown in FIG. 4, the flexible substrate 200 includes first recesses 211 and second recesses 221. Along the thickness direction of the flexible substrate 200, the projection of the center P1 of a first recess 211 and the projection of the center P2 of a second recess 221 are staggered. That is, along the thickness direction of the flexible substrate 200, a first recess 211 and a second recess 221 do not completely coincide with each other, providing a force transmission path for each of the two sides of the flexible substrate 200. Specifically, with this arrangement, when the flexible substrate 200 is bent or impacted, stress generated by the flexible substrate 200 can be dispersed to the two sides, ensuring the structural stability of the flexible substrate 200 and the structural stability of the bendable film structure 10. Moreover, a first recess 211 and a second recess 221 do not completely coincide with each other so that the lowest point of a first recess relative to the first side 210 of the flexible substrate 200 and the lowest point of a second recess 221 relative to the second side 220 of the flexible substrate 200 are staggered, preventing the flexible substrate 200 from break due to a too small thickness of the part at this position of the flexible substrate 200 when the flexible substrate 200 is bent or impacted.

With continued reference to FIG. 4, the orthographic projection of a first recess 211 on the flexible substrate 200 is between orthographic projections of two adjacent second recesses 221 on the flexible substrate 200.

In one embodiment, as shown in FIG. 4, along the thickness direction of the flexible substrate 200, the orthographic projection of a first recess 211 is between orthographic projections of two adjacent second recesses 221. That is, a first recess 211 and a second recess 221 on the two sides of the flexible substrate 200 are completely staggered. That is, the lowest point of a first recess 211 relative to the first side 210 of the flexible substrate 200 faces the non-recessed region 222 on the second side 220 of the flexible substrate 200, the lowest point of a second recess 221 relative to the second side 220 of the flexible substrate 200 faces the non-recessed region 212 on the first side 210 of the flexible substrate 200, and a first recess 211 and a second recess 221 are staggered as much as possible. It is feasible to increase the thickness of the flexible substrate 200 in the bendable region 100 as much as possible, preventing an overlap between a first recess 211 and a second recess 221 from causing a smaller thickness of the flexible substrate 200, preventing the flexible substrate 200 from being broken when the flexible substrate 200 is bent or impacted, improving the structural stability of the flexible substrate 200 and the structural stability of the bendable film structure 10, and making the bendable film structure 10 applicable to different environments.

With continued reference to FIGS. 4 to 11, the flexible substrate 200 includes a first filler layer 310 and a second filler layer 320. The first filler layer 310 and the second filler layer 320 include the same material.

First recesses 211 of the flexible substrate 200 are filled by the first filler layers 310. Second recesses 221 of the flexible substrate 200 are filled by the second filler layers 320. That is, the first recesses 211 and the second recesses 221 are filled by the filler layers 300. In this manner, when the flexible substrate 200 is bent or deformed, stress can be better dispersed, and the structural stability of the flexible substrate 200 can be ensured. Further, the first filler layer 310 and the second filler layer 320 may have the same material and are more elastic than the flexible substrate 200. The first filler layer 310 and the second filler layer 320 are configured to have the same material, simplifying the manufacturing process and manufacturing costs of the bendable film structure 10.

Optionally, the first filler layer 310 includes at least one of silica gel, TPU, rubber, polyacrylate elastomer, or polyester elastomer.

Illustratively, the material of the first filler layer 310 may be at least one of silica gel, TPU, rubber, polyacrylate elastomer, or polyester elastomer. Similarly, the material of the second filler layer 320 may be at least one of silica gel, TPU, rubber, polyacrylate elastomer, or polyester elastomer. Further, the high-elastic materials of the first filler layers 310 and the second filler layers 320 and the corresponding first recesses 211 and the corresponding second recesses 221 of the flexible substrate 200 are bonded to the film surfaces by hot pressing, by a primer silane coupling agent for film preprocessing, or by hot curing. The filler layers 300 are embedded in the recesses and thus are easily secured to the first recesses 211 and the second recesses 221. Further, the first filler layer 310 and the second filler layer 320 may have a transparent material to ensure that the flexible substrate 200 does not affect light transmission, thereby enriching the application scenarios of the flexible substrate 200.

Figure 12:
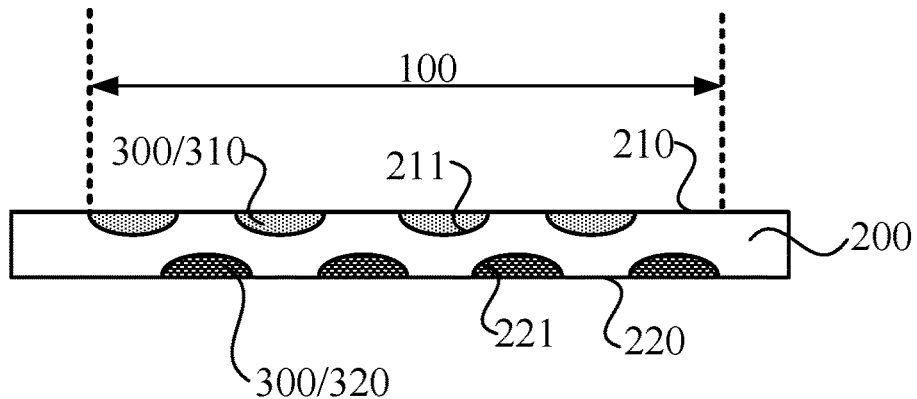
FIG. 12 is another section view taken along the section line A-A' of FIG. 1.

FIG. 12 is another section view taken along the section line A-A' of FIG. 1. As shown in FIG. 12, the flexible substrate 200 includes a first filler layer 310 and a second filler layer 320. The hardness of the first filler layer 310 is greater than the hardness of the second filler layer 320.

The first filler layer 310 and the second filler layer 320 that fill the recesses on the two sides of the flexible substrate 200 may have different materials, refining stress dispersion when the flexible substrate 200 is bent or deformed and ensuring the structural stability of the flexible substrate 200. Specifically, the first filler layers 310 are in the first recesses 211, the second filler layers 320 are in the second recesses 221, and the first recesses 211 and the second recesses 221 are on the two sides of the flexible substrate 200. When the first recesses 211 and the first filler layers 310 are at the inner side of the flexible substrate 200 when the flexible substrate 200 is bent, it is required to increase the material hardness of the first filler layers 310 to improve the impact resistance of the flexible substrate 200. When the second recesses 221 and the second filler layers 320 are on the outer side of the flexible substrate 200 when the flexible substrate 200 is bent, the second filler layers 320 are required to be more elastic. The material difference between the first filler layers 310 and the second filler layers 320 makes possible both a better surface hardness and a better impact resistance of the flexible substrate 200.

Figure 13:
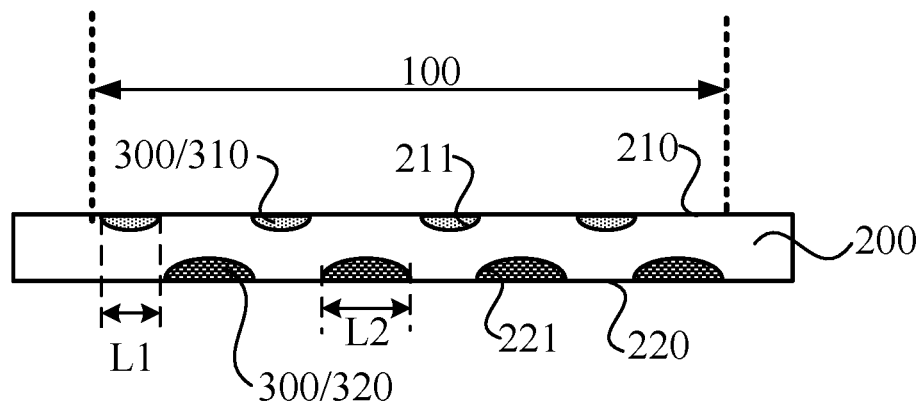
FIG. 13 is another section view taken along the section line A-A' of FIG. 1.

FIG. 13 is another section view taken along the section line A-A' of FIG. 1. As shown in FIGS. 1 and 13, the area of the projection of the first filler layer 310 on a first plane is less than the area of the projection of the second filler layer 320 on the first plane; and the first plane is perpendicular to the plane where the flexible substrate 200 is located, and the first plane is perpendicular to the bending axis Z of the bendable film structure 10.

As shown in FIG. 13, along the thickness direction of the flexible substrate 200, the projection section length of the first filler layer 310 is L1, and the projection section length of the second filler layer 320 is L2. The projection section length of the first filler layer may be less than the projection section length of the second filler layer 320. That is, the area of the projection of the first filler layer 310 on the first plane is less than the area of the projection of the second filler layer 320 on the first plane. Specifically, the hardness of the first filler layer 310 is greater than the hardness of the second filler layer 320. That is, when the flexible substrate 200 is bent, each first recess 211 on the inner side is filled by a high-hardness material, and each second recess 221 on the outer side is filled by a high-elastic material. Moreover, the size of the first filler layer 310 is smaller than the size of the second filler layer 320. That is, the second filler layer 320 on the outer side of the flexible substrate 200 has a bigger size when the hardness of the inner side of the bent flexible substrate 200 is ensured, making the flexible substrate 200 bendable more easily, that is, improving the structural flexibility and stability of the flexible substrate 200.

The hardness of the first filler layer 310 is greater than or equal to 3H.

The material hardness of the first filler layer 310 is large, for example, greater than or equal to 3H. It is to be noted that generally the hardness of the substrate of a film structure is below 1H. It is feasible to add a high-hardness material to enhance the material hardness so that the film structure is not prone to damage when being impacted, that is, the structural stability of the flexible substrate 200 is improved.

Optionally, the first filler layer 310 includes an epoxy material doped with inorganic nanoparticles or an acrylic acid material doped with inorganic nanoparticles.

The material of the first filler layer 310 has a large hardness and may include an epoxy material or an acrylic acid material. Moreover, the epoxy material or the acrylic acid material is doped with inorganic nanoparticles, better enhancing the material hardness of the first filler layer 310, better ensuring the structural stability of the flexible substrate 200 and the structural stability of the bendable film structure 10 when the flexible substrate 200 is bent or impacted.

Figure 14:
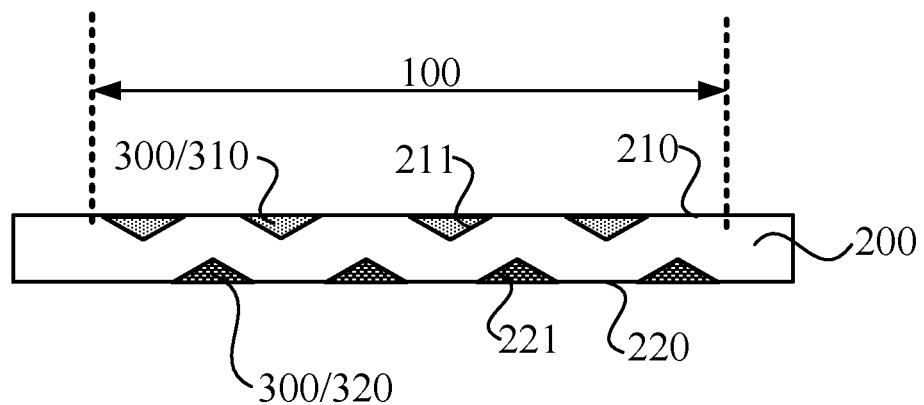
FIG. 14 is another section view taken along the section line A-A' of FIG. 1.
Figure 15:
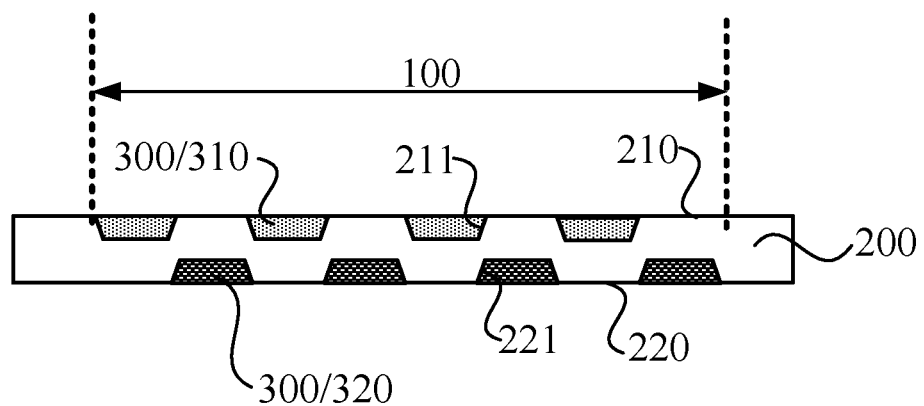
FIG. 15 is another section view taken along the section line A-A' of FIG. 1.
Figure 16:
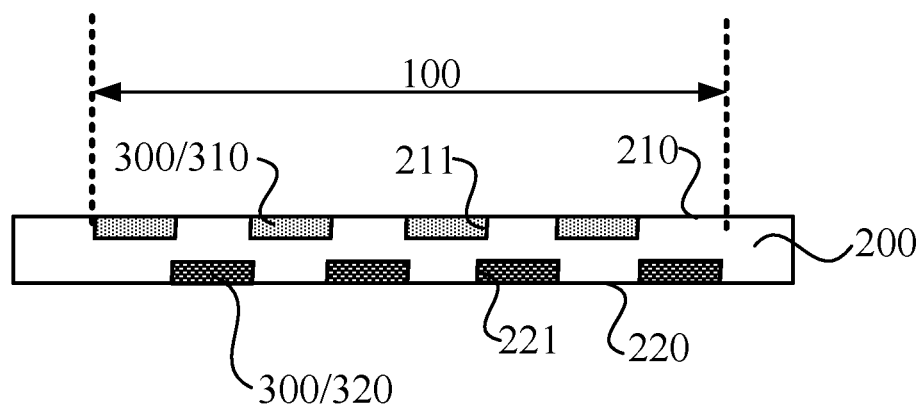
FIG. 16 is another section view taken along the section line A-A' of FIG. 1.

FIG. 14 is another section view taken along the section line A-A' of FIG. 1. FIG. 15 is another section view taken along the section line A-A' of FIG. 1. FIG. 16 is another section view taken along the section line A-A' of FIG. 1. With continued reference to FIGS. 1 and 12 and FIGS. 14 to 16, the projection of the filler layer 300 on a first plane is least one of triangular, semicircular, trapezoidal, or rectangular; and the first plane is perpendicular to the plane where the flexible substrate 200 is located, and the first plane is perpendicular to the bending axis of the bendable film structure 10.

The shapes of the first recesses 211 and the second recesses 221 on the two sides of the flexible substrate 200 are diverse, so the shapes of the first filler layers filled 310 in the first recesses 211 and the second filler layers 320 filled in the second recesses 221 are also diverse. As shown in FIG. 14, the projection of each filler layer 300 on the first plane may be a triangle. As shown in FIG. 15, the projection of each filler layer 300 on the first plane may be a trapezoid. As shown in FIG. 16, the projection of each filler layer 300 on the first plane may be a rectangle. As shown in FIG. 12, the projection of each filler layer 300 on the first plane may be a semicircle. That is, each recess in the flexible substrate 200 in the bendable region 100 may be configured to be, for example, a semicircle, a triangle, a trapezoid, or a rectangle, and each corresponding filler layer 300 may also be configured to be, for example, a semicircle, a triangle, a trapezoid, or a rectangle. Moreover, each recess may be formed by being etched, and then each first recess 211 and each second recess 221 are filled by a high-elastic filler layer 300, reducing the processing difficulty and reducing the manufacturing costs of the flexible substrate 200.

Figure 17:
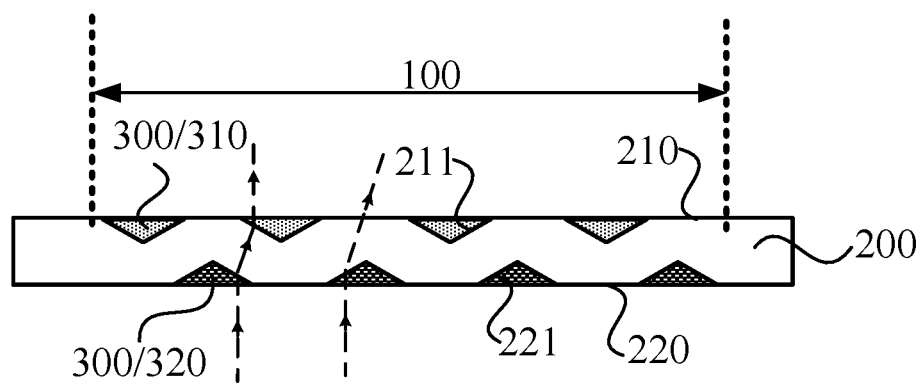
FIG. 17 is another section view taken along the section line A-A' of FIG. 1.

FIG. 17 is another section view taken along the section line A-A' of FIG. 1. As shown in FIG. 17, each filler layer 300 has a transmittance of greater than 90% and a haze of less than 1%.

Specifically, the bendable film structure 10 may be used in a display device having a display function and may be disposed above the display layer. To prevent the bendable film structure 10 from affecting light transmission, the optical property of each filler layer 300 filled in the flexible substrate 200 may be limited. Specifically, each filler layer 300 may have a transmittance of greater than 90% and a haze of less than 1%. That is, each first filler layer 310 and each second filler layer 320 have a big transmittance and a small haze, not affecting passing light too much, thereby ensuring the light transmission effect of the flexible substrate 200 or the bendable film structure 10 and enriching the application scenarios of the bendable film structure 10.

With continued reference to FIG. 17, the difference between the refractive index of each filler layer 300 and the refractive index of the flexible substrate 200 is less than 0.1.

When the bendable film structure 10 is located above the display layer, to avoid a large deflection of light transmitted through the bendable film structure 10 or the flexible substrate 200, it is feasible to adjust the refractive index of each filler layer 300 and the refractive index of the flexible substrate 200, that is, reduce the difference between the refractive index of each filler layer 300 and the refractive index of the flexible substrate 200. That is, it is feasible to optimize the optical property of materials and reduce the difference between the refractive indexes of different materials, weakening the refraction effects of light on interfaces of different materials, avoiding deflection of light transmitted through the bendable region 100 of the flexible substrate 200, avoiding a color cast effect, and improving the overall display effect.

Figure 18:
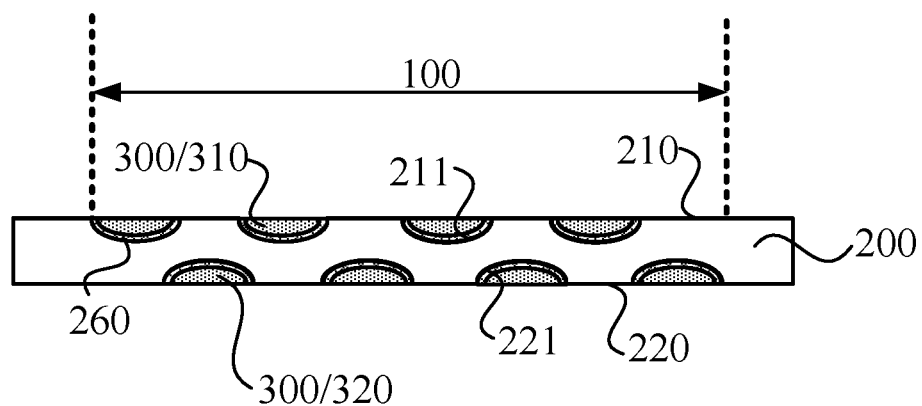
FIG. 18 is another section view taken along the section line A-A' of FIG. 1.

FIG. 18 is another section view taken along the section line A-A' of FIG. 1. As shown in FIG. 18, an adhesive layer 260 is configured between the filler layer 300 and the flexible substrate 200.

An adhesive layer 260 is configured between the filler layer 300 and the flexible substrate 200, so that the filler layer 300 is stably bonded to the flexible substrate 200. Specifically, as shown in FIG. 18, an adhesive layer 260 is configured between the first recess 211 and the corresponding first filler layer 310, and an adhesive layer 260 is configured between the second recess 221 and the corresponding second filler layer 320, ensuring the structural stability between each first recess 211 and the corresponding first filler layer 310 and the structural stability between each second recess 221 and the corresponding second filler layer 320, thereby preventing the filler layer 300 from being away from the flexible substrate 200 when the flexible substrate 200 is bent or impacted and thus ensuring the structural stability of the flexible substrate 200.

Optionally, with continued reference to FIG. 18, the adhesive layer 260 includes a primer silane coupling agent.

Illustratively, with continued reference to FIG. 18, the material of the adhesive layer 260 may be a primer silane coupling agent that ensures a better adhesion, thereby preventing each filler layer 300 from being away from the flexible substrate 200 when the flexible substrate 200 is bent or impacted and thus ensuring the structural stability of the flexible substrate 200.

FIG. 19 is another section view taken along the section line A-A' of FIG. 1. As shown in FIG. 19, at least one side of the bendable film structure 10 is provided with an optical adhesive 270.

Further, at least one side of the bendable film structure 10 is provided with an optical adhesive 270. That is, at least one side of the flexible substrate 200 is provided with an optical adhesive 270. By way of example, as shown in FIG. 19, the two sides of the flexible substrate 200 are each provided with an optical adhesive 270. The optical adhesive 270 ensures a stable contact with the filler layers 300 in the flexible substrate 200, that is, ensures the structural stability and evenness of the flexible substrate 200, and thereby ensures the structural stability and evenness of the bendable film structure 10.

Based on the same inventive concept, an embodiment of the present disclosure provides a manufacturing method of a bendable film structure. FIG. 20 is a flowchart of a manufacturing method of a bendable film structure according to an embodiment of the present disclosure. The method includes S110, S120, and S130.

In S110, a flexible substrate is formed, where the flexible substrate includes at least one bendable region, where in each of the at least one bendable region, multiple first recesses are configured on a first side of the flexible substrate, and/or multiple second recesses are configured on a second side of the flexible substrate.

The bendable film structure includes at least one bendable region and can be bent or folded in the at least one bendable region, facilitating miniaturization of the bendable film structure. Further, the bendable film structure may include multiple bendable regions, that is, may be bent in multiple regions. This is not limited by this embodiment of the present disclosure.

In S120, a first filler layer is formed in a respective first recess of the multiple first recesses, and a second filler layer is formed in a respective second recess of the multiple second recesses, where at least one of the first filler layer or the second filler layer has an elasticity greater than the flexible substrate.

Further, the bendable film structure also includes a flexible substrate and a filler layer. The first side of the flexible substrate includes multiple first recesses, and the filler layer includes a first filler layer that fills the multiple first recesses. When the flexible substrate is bent in the bendable region, the first recesses and the first filler layer in the first recesses have can disperse the deformation stress generated by the flexible substrate, thereby reducing creep of the flexible substrate, alleviating bending lines in the bendable region of the bendable film structure, and ensuring the structural stability of the bendable film structure.

Illustratively, the second side of the flexible substrate includes multiple second recesses, and the filler layer also includes a second filler layer that fills the multiple second recesses. The second side and the first side are opposite sides of the flexible substrate. The first side is the inner side of the flexible substrate when the bendable film structure is bent. That is, recesses disposed on either side of the flexible substrate and filled by the filler layer can reduce creep of the flexible substrate and thus alleviate bending lines in the bendable region of the bendable film structure.

Illustratively, multiple first recesses are disposed at the first side of the flexible substrate and filled by the first filler layer, and multiple second recesses are disposed at the second side of the flexible substrate and filled by the second filler layer. The first side is the inner side of the flexible substrate when the bendable film structure is bent. The second side is opposite to the first side. Recesses disposed on both sides of the flexible substrate and filled by the filler layer can better reduce creep of the flexible substrate and thus alleviate bending lines in the bendable region of the bendable film structure.

Further, at least one of the first filler layer or the second filler layer has an elasticity greater than the flexible substrate. That is, the first recesses and/or the second recesses are filled by a high-elastic material so that when the flexible substrate is bent or impacted, the first filler layer and the second filler layer can effectively absorb part of deformation force and reduce creep generated between films, thereby ensuring the structural stability of the flexible substrate and the structural stability of the bendable film structure.

In S130, surfaces of the bendable region are processed such that when the bendable film structure is unbent, the surface of the first filler layer facing away from the second filler layer is flush with the surface of the flexible substrate on two sides of each first recess, and the surface of the second filler layer facing away from the second filler layer is flush with the surface of the flexible substrate on two sides of each second recess.

Illustratively, multiple first recesses are disposed on the first side of the flexible substrate. A non-recessed region is disposed between two adjacent first recesses. Moreover, at least part of the surface of the first filler layer filled in the first recesses is flush with at least part of the surface of the non-recessed region, ensuring that the flexible substrate is even and thus ensuring that the bendable film structure has even surfaces.

Illustratively, multiple second recesses are disposed on the second side of the flexible substrate. A non-recessed region is disposed between two adjacent second recesses. Moreover, at least part of the surface of the second filler layer filled in the second recesses is flush with at least part of the surface of the non-recessed region, ensuring that the flexible substrate is even and thus ensuring that the bendable film structure has even surfaces.

Further, multiple first recesses are disposed on the first side of the flexible substrate, and a non-recessed region is disposed between two adjacent first recesses; and multiple second recesses are disposed on the second side of the flexible substrate, and a non-recessed region is disposed between two adjacent second recesses. Moreover, at least part of the surface of the first filler layer filled in the first recesses is flush with at least part of the surface of the non-recessed region, and at least part of the surface of the second filler layer filled in the second recesses is flush with at least part of the surface of the non-recessed region, ensuring that both surfaces of the flexible substrate are even, ensuring that the bendable film structure has even surfaces, and facilitating subsequent manufacturing of other films.

In the manufacturing method of a bendable film structure of this embodiment of the present disclosure, recesses on the first side and/or the second side of the flexible substrate are filled by a high-elastic filler layer so that when the flexible substrate is bent or impacted, the filler layer can absorb part of deformation force, reduce creep of the flexible substrate, and alleviate bending lines in the bendable region of the bendable film structure, ensuring the structural stability of the bendable film structure.

Figure 21:
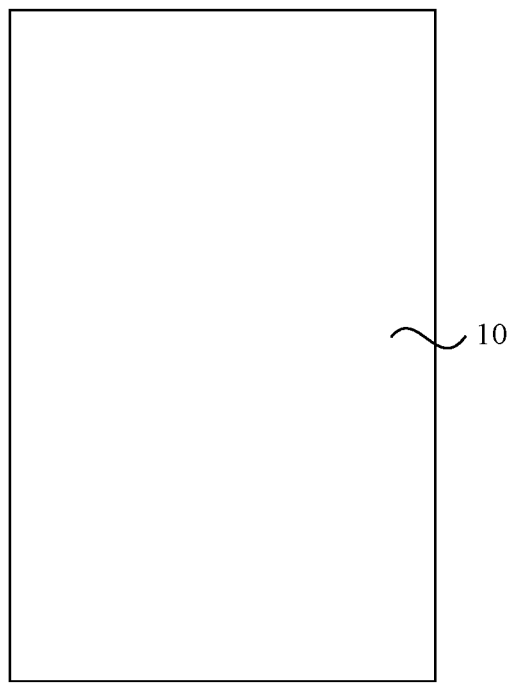
FIG. 21 is a diagram illustrating the structure of a display panel according to an embodiment of the present disclosure.

Based on the same inventive concept, an embodiment of the present disclosure provides a display panel. The display panel 1 includes the bendable film structure 10 of any previous embodiment. Specifically, FIG. 21 is a diagram illustrating the structure of a display panel according to an embodiment of the present disclosure. Therefore, the display panel 1 of this embodiment of the present disclosure has the effects of the solution of any previous embodiment. Structures and terms that are the same as or that correspond to the previous embodiments are not re-explained here.

Figure 22:
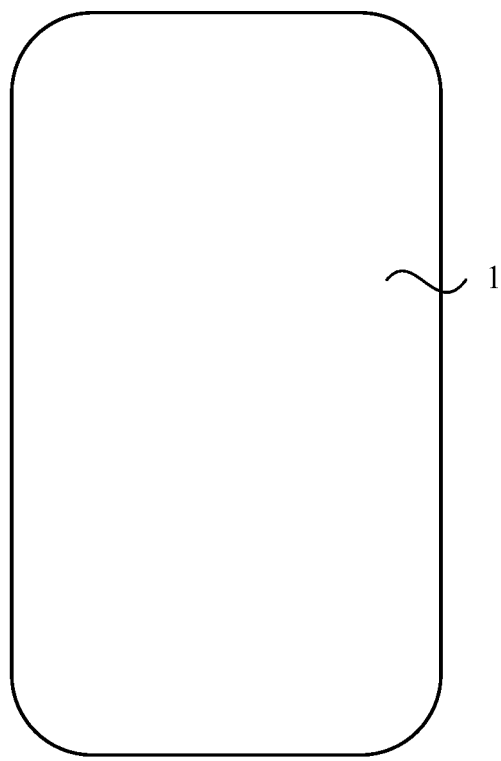
FIG. 22 is a diagram illustrating the structure of a display device according to an embodiment of the present disclosure.

Based on the same inventive concept, an embodiment of the present disclosure provides a display device. The display device includes the display panel of the previous embodiment. Specifically, FIG. 22 is a diagram illustrating the structure of a display device according to an embodiment of the present disclosure. As shown in FIG. 22, the display device 2 includes the display panel 1.

Therefore, the display device 2 of this embodiment of the present disclosure has the effects of the solution of any previous embodiment. Structures and terms that are the same as or that correspond to the previous embodiments are not re-explained here. The display device 2 of this embodiment of the present disclosure may be the cellphone shown in FIG. 22 or may be any other electronic product having a display function. In this embodiment, the electronic product includes, but is not limited to, a television set, a laptop, a desktop display, a tablet, a digital camera, a smart bracelet, smart glasses, an in-vehicle display, a medical device, an industrial control device, or a touch interactive terminal.

It is to be noted that the preceding are only preferred embodiments of the present disclosure and the technical principles used therein. It will be understood by those skilled in the art that the present disclosure is not limited to the embodiments described herein, and that the features of the various embodiments of the present disclosure may be coupled or combined in part or in whole with each other, and may be collaborated with each other and technically driven in various ways. Those skilled in the art can make various apparent modifications, adaptations, combinations and substitutions without departing from the scope of the present disclosure. Therefore, while the present disclosure is described in detail through the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A bendable film structure, comprising at least one bendable region, a flexible substrate, and a filler layer, wherein
   in the at least one bendable region, a plurality of first recesses are configured on a first side of the flexible substrate, and the filler layer comprises a first filler layer that fills a respective first recess of the plurality of first recesses; and/or a plurality of second recesses are configured on a second side of the flexible substrate, and the filler layer further comprises a second filler layer that fills a respective second recess of the plurality of second recesses,
   wherein the first side is an inner side of the flexible substrate when the bendable film structure is bent, and the second side is opposite to the first side, and at least one of the first filler layer or the second filler layer has an elasticity greater than the flexible substrate;
   wherein in the bendable region, the flexible substrate comprises a flat region, the flat region is located between two adjacent first recesses and/or between two adjacent second recesses;
   wherein a surface of the flat region comprises a plurality of first sub-recesses;
   wherein among the plurality of first sub-recesses, the plurality of first recesses, and the plurality of second recesses, a projected area of a first sub-recess on the surface of the flat region located between the two adjacent first recesses on the flexible substrate is smaller than a projected area of a first recess on the flexible substrate, the projected area of the first sub-recess on the surface of the flat region located between the two adjacent second recesses on the flexible substrate is smaller than a projected area of a second recess on the flexible substrate; and/or
   a depth of the first sub-recess on the surface of the flat region located between the two adjacent first recesses in a direction perpendicular to the flexible substrate is less than a depth of the first recess in the direction perpendicular to the flexible substrate, the depth of the first sub-recess on the surface of the flat region located between the two adjacent second recesses in the direction perpendicular to the flexible substrate is less than a depth of the second recess in the direction perpendicular to the flexible substrate; and
   wherein orthographic projections of the plurality of first sub-recesses on the surface of the flat region located between the two adjacent first recesses on the flexible substrate overlap an orthographic projection of a corresponding second recess on the flexible substrate; and/or
   the orthographic projections of the plurality of first sub-recesses on the surface of the flat region located between the two adjacent second recesses on the flexible substrate overlap an orthographic projection of a corresponding first recess on the flexible substrate.

2. The bendable film structure of claim 1, wherein when the bendable film structure is unbent, at least part of a surface of the filler layer facing away from the flexible substrate is flush with at least part of a surface of a non-recessed region.

3. The bendable film structure of claim 1, wherein a projection of the filler layer on a first plane is at least one of triangular, semicircular, trapezoidal, or rectangular; and
   the first plane is perpendicular to a plane where the flexible substrate is located, and the first plane is perpendicular to a bending axis of the bendable film structure.

4. The bendable film structure of claim 1, wherein the filler layer has a transmittance of greater than 90% and a haze of less than 1%.

5. The bendable film structure of claim 1, wherein a difference between a refractive index of the filler layer and a refractive index of the flexible substrate is less than 0.1.

6. The bendable film structure of claim 1, wherein at least one side of the bendable film structure is provided with an optical adhesive.

7. The bendable film structure of claim 1, wherein among the plurality of first recesses, an inner wall of a first recess comprises a plurality of second sub-recesses; the first filler layer comprises a plurality of first protrusions; and among the plurality of second sub-recesses and the plurality of first protrusions, a first protrusion fills a second sub-recess; and/or
   among the plurality of second recesses, an inner wall of a second recess comprises a plurality of third sub-recesses, the second filler layer comprises a plurality of second protrusions, and among the plurality of third sub-recesses and the plurality of second protrusions, a second protrusion fills a third sub-recess.

8. The bendable film structure of claim 1, wherein
   the flexible substrate comprises a plurality of cyclic repetitive units in the bendable region; among the repetitive units, a projection of a repetitive unit on a first plane comprises at least one curve;
   among the plurality of first recesses and the plurality of second recesses, a first recess and/or a second recess is formed in a hollow of the curve; and
   the first plane is perpendicular to a plane where the flexible substrate is located, and the first plane is perpendicular to a bending axis of the bendable film structure.

9. The bendable film structure of claim 8, further comprising unbendable regions located on two sides of the bendable region, wherein along a direction perpendicular to an extension direction of the flexible substrate, a thickness of at least part of the flexible substrate in the bendable region is less than a thickness of the flexible substrate in the unbendable regions.

10. The bendable film structure of claim 8, wherein along a direction from a center of the bendable region to the unbendable region, a cycle of the repetitive unit increases.

11. The bendable film structure of claim 8, wherein a cycle T of the repetitive unit satisfies 100 μm≤T≤500 μm.

12. The bendable film structure of claim 11, further comprising unbendable regions located on two sides of the bendable region, wherein the surface of the flat region is flush with a surface of the flexible substrate in the unbendable region, and the surface of the flat region is on a same side as the surface of the flexible substrate in the unbendable region.

13. The bendable film structure of claim 12, wherein along a direction perpendicular to the bending axis of the bendable film structure, a width D1 of the flat region satisfies 50 μm≤D1≤250 μm.

14. The bendable film structure of claim 1, wherein along a direction perpendicular to an extension direction of the flexible substrate, a thickness of the filler layer is less than half of a thickness of the flexible substrate.

15. The bendable film structure of claim 14, wherein the thickness D3 of the filler layer satisfies 10 μm≤D3≤50 μm.

16. The bendable film structure of claim 1, wherein
the flexible substrate comprises the plurality of first recesses and the plurality of second recesses, wherein among the plurality of first recesses and the plurality of second recesses, an orthographic projection of a center of a first recess on the flexible substrate and an orthographic projection of a center of a second recess on the flexible substrate are staggered.

17. The bendable film structure of claim 16, wherein among the plurality of first recesses and the plurality of second recesses, an orthographic projection of a first recess on the flexible substrate is between orthographic projections of two adjacent second recesses on the flexible substrate.

18. The bendable film structure of claim 1, wherein
the flexible substrate comprises the first filler layer and the second filler layer, wherein
the first filler layer and the second filler layer comprise a same material.

19. The bendable film structure of claim 18, wherein the first filler layer comprises at least one of silica gel, TPU, rubber, polyacrylate elastomer, or polyester elastomer.

20. The bendable film structure of claim 1, wherein
the flexible substrate comprises the first filler layer and the second filler layer, wherein
a hardness of the first filler layer is greater than a hardness of the second filler layer.

21. The bendable film structure of claim 20, wherein an area of a projection of the first filler layer on a first plane is less than an area of a projection of the second filler layer on the first plane; and the first plane is perpendicular to a plane where the flexible substrate is located, and the first plane is perpendicular to a bending axis of the bendable film structure.

22. The bendable film structure of claim 20, wherein the hardness of the first filler layer is greater than or equal to 3H.

23. The bendable film structure of claim 20, wherein the first filler layer comprises an epoxy material doped with inorganic nanoparticles or an acrylic acid material doped with inorganic nanoparticles.

24. The bendable film structure of claim 1, wherein an adhesive layer is disposed between the filler layer and the flexible substrate.

25. The bendable film structure of claim 24, wherein the adhesive layer comprises a primer silane coupling agent.

26. A display panel, comprising a bendable film structure, wherein the bendable film structure comprises: at least one bendable region, a flexible substrate, and a filler layer, wherein
in the at least one bendable region, a plurality of first recesses are configured on a first side of the flexible substrate, and the filler layer comprises a first filler layer that fills a respective first recess of the plurality of first recesses; and/or a plurality of second recesses are configured on a second side of the flexible substrate, and the filler layer further comprises a second filler layer that fills a respective second recess of the plurality of second recesses,
wherein the first side is an inner side of the flexible substrate when the bendable film structure is bent, and the second side is opposite to the first side, and
at least one of the first filler layer or the second filler layer has an elasticity greater than the flexible substrate;
wherein in the bendable region, the flexible substrate comprises a flat region, the flat region is located between two adjacent first recesses and/or between two adjacent second recesses;
wherein a surface of the flat region comprises a plurality of first sub-recesses;
wherein among the plurality of first sub-recesses, the plurality of first recesses, and the plurality of second recesses, a projected area of a first sub-recess on the surface of the flat region located between the two adjacent first recesses on the flexible substrate is smaller than a projected area of a first recess on the flexible substrate, the projected area of the first sub-recess on the surface of the flat region located between the two adjacent second recesses on the flexible substrate is smaller than a projected area of a second recess on the flexible substrate; and/or
a depth of the first sub-recess on the surface of the flat region located between the two adjacent first recesses in a direction perpendicular to the flexible substrate is less than a depth of the first recess in the direction perpendicular to the flexible substrate, the depth of the first sub-recess on the surface of the flat region located between the two adjacent second recesses in the direction perpendicular to the flexible substrate is less than a depth of the second recess in the direction perpendicular to the flexible substrate; and
wherein orthographic projections of the plurality of first sub-recesses on the surface of the flat region located between the two adjacent first recesses on the flexible substrate overlap an orthographic projection of a corresponding second recess on the flexible substrate; and/or
the orthographic projections of the plurality of first sub-recesses on the surface of the flat region located between the two adjacent second recesses on the flexible substrate overlap an orthographic projection of a corresponding first recess on the flexible substrate.

27. A display device, comprising the display panel of claim 26.

28. A manufacturing method of a bendable film structure, comprising:
forming a flexible substrate, wherein the flexible substrate comprises at least one bendable region, wherein in the at least one bendable region, a plurality of first recesses are configured on a first side of the flexible substrate, and/or a plurality of second recesses are configured on a second side of the flexible substrate;
forming a first filler layer in a respective first recess of the plurality of first recesses and forming a second filler layer in a respective second recess of the plurality of second recesses, wherein at least one of the first filler layer or the second filler layer has an elasticity greater than the flexible substrate; and processing surfaces of the bendable region such that when the bendable film structure is unbent, a surface of the first filler layer facing away from the second filler layer is flush with a surface of the flexible substrate on two sides of a first recess of the plurality of first recesses, and a surface of the second filler layer facing away from the first filler layer is flush with a surface of the flexible substrate on two sides of a second recess of the plurality of second recesses;

wherein a joint of openings of two adjacent recesses is a smooth curved surface wherein in the bendable region, the flexible substrate comprises a flat region, the flat region is located between two adjacent first recesses and/or between two adjacent second recesses;

wherein a surface of the flat region comprises a plurality of first sub-recesses;

wherein among the plurality of first sub-recesses, the plurality of first recesses, and the plurality of second recesses, a projected area of a first sub-recess on the surface of the flat region located between the two adjacent first recesses on the flexible substrate is smaller than a projected area of a first recess on the flexible substrate, the projected area of the first sub-recess on the surface of the flat region located between the two adjacent second recesses on the flexible substrate is smaller than a projected area of a second recess on the flexible substrate; and/or a depth of the first sub-recess on the surface of the flat region located between the two adjacent first recesses in a direction perpendicular to the flexible substrate is less than a depth of the first recess in the direction perpendicular to the flexible substrate, the depth of the first sub-recess on the surface of the flat region located between the two adjacent second recesses in the direction perpendicular to the flexible substrate is less than a depth of the second recess in the direction perpendicular to the flexible substrate; and wherein orthographic projections of the plurality of first sub-recesses on the surface of the flat region located between the two adjacent first recesses on the flexible substrate overlap an orthographic projection of a corresponding second recess on the flexible substrate; and/or the orthographic projections of the plurality of first sub-recesses on the surface of the flat region located between the two adjacent second recesses on the flexible substrate overlap an orthographic projection of a corresponding first recess on the flexible substrate.

* * * * *